US007042591B1

(12) United States Patent
Yamazaki et al.

(10) Patent No.: US 7,042,591 B1
(45) Date of Patent: May 9, 2006

(54) IMAGE EXPOSURE APPARATUS AND IMAGE FORMING APPARATUS

(75) Inventors: Katsuyuki Yamazaki, Shizuoka-ken (JP); Toshiyuki Sekiya, Mishima (JP); Mitsuo Shiraishi, Shizuoka-ken (JP); Junji Ishikawa, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1045 days.

(21) Appl. No.: 09/624,377

(22) Filed: Jul. 27, 2000

(30) Foreign Application Priority Data

Jul. 30, 1999 (JP) ................................ 11-217548
Jul. 30, 1999 (JP) ................................ 11-217549

(51) Int. Cl.
*G06F 15/00* (2006.01)

(52) U.S. Cl. ........................................... 358/1.5; 399/4

(58) Field of Classification Search ............... 358/1.15, 358/509, 513, 514, 475, 482, 483, 1.1, 1.5, 358/1.4; 347/130; 399/4, 207
See application file for complete search history.

(56) References Cited

U.S. PATENT DOCUMENTS 5,065,188 A * 11/1991 Kobayashi et al. ......... 399/186
5,177,405 A 1/1993 Kusuda et al.
5,451,977 A 9/1995 Kusuda et al.
5,655,189 A * 8/1997 Murano ...................... 399/220
6,115,184 A * 9/2000 Hubble et al. .............. 359/627
6,121,637 A * 9/2000 Isokawa et al. ............... 257/99
6,219,074 B1 * 4/2001 Chosa et al. ................ 347/130

FOREIGN PATENT DOCUMENTS

| | | |
|---|---|---|
| JP | 1-238962 | 9/1989 |
| JP | 2-208067 | 8/1990 |
| JP | 2-212170 | 8/1990 |
| JP | 3-020457 | 1/1991 |
| JP | 3-194978 | 8/1991 |
| JP | 4-005872 | 1/1992 |
| JP | 4-023367 | 1/1992 |
| JP | 4-296579 | 10/1992 |
| JP | 5-084971 | 4/1993 |
| JP | 06-115154 | 4/1994 |
| JP | 08-244277 | 9/1996 |
| JP | 2000-47462 | 2/2000 |

* cited by examiner

*Primary Examiner*—Mark Wallerson
(74) *Attorney, Agent, or Firm*—Fitzpatrick, Cella, Harper & Scinto

(57) ABSTRACT

The present invention provides an image exposure apparatus which has a light emitting chip including a plurality of light emitting elements, a base plate for mounting the chip thereon, a lens for imaging light emitted from the plurality of light emitting elements on an exposure surface, an electrode disposed in the vicinity of the lens, and an insulative protecting member for protecting the chip, wherein a gap is provided between the electrode and the protecting member.

6 Claims, 9 Drawing Sheets

IMAGE EXPOSURE APPARATUS AND IMAGE FORMING APPARATUS

BACKGROUND OF THE INVENTION

1. Field of the Invention

The present invention relates to an image exposure apparatus and an image forming apparatus, particularly to an image exposure apparatus using an LED array and an image forming apparatus provided with the image exposure apparatus.

2. Related Background Art

A conventional self-scanning light emitting diode array (hereinafter referred to simply as SLED) is disclosed in Japanese Patent Application Laid-open Nos. 1-238962, 2-208067, 2-212170, 3-20457, 3-194978, 4-5872, 4-23367, 4-296579, and 5-84971, Japan Hard Copy '91 (A-17) Proposal of Light Emitting Element Array for Optical Printer with integrated Drive Circuit, the Society of Electronic Information Communication ('90. 3. 5) Proposal of Self-scanning Light Emitting Element (SLED) using PNPN Thyristor Structure, and the like, and has been noted as a recording light emitting element.

Here, the conventional SLED will be described with reference to FIG. 3. FIG. 3 is a partial circuit diagram of the conventional SLED, and an operation will be described.

In FIG. 3, character VGA denotes a power source voltage of SLED, and connected, as shown in FIG. 3, to diodes cascade-connected to ϕS via a resistance R of FIG. 3.

As shown in FIG. 3, SLED comprises transmitting thyristors ST1 to ST5 arranged in an array and light emitting thyristors SL1 to SL5 arranged in an array, gate signals of the respective thyristors are connected, and a first thyristor is connected to a signal input portion of ϕS. Additionally, the number of thyristors is not limited to five as shown in FIG. 3, and any other arbitrary number of thyristors may be disposed.

In a constitution, a second thyristor gate is connected to a diode cathode connected to a terminal of ϕS, and a third thyristor gate is connected to the next diode cathode.

(Operation of SLED)

An operation of SLED shown in FIG. 3 will next be described with reference to FIGS. 3 and 4. FIG. 4 is a timing chart of a signal for controlling SLED shown in FIG. 3, and FIG. 4 shows an example in which all elements (SL1 to SL5) are lit.

Transmitting and light emitting will be described with reference to the timing chart of FIG. 4. The transmitting starts by changing ϕS to 5 V from 0 V.

When ϕS turns to 5 V, in FIG. 3, Va=5 V, Vb=3.7 V (a diode forward direction voltage fall is set to 1.3 V), Vc=2.4 V, Vd=1.1 V, 0 V on and after Ve, and gate signals of the transmitting thyristors ST1 and ST2 change to 5 V, 3.7 V, respectively, from 0 V.

When ϕ1 is changed to 0 V from 5 V in this state, respective potentials of the transmitting thyristor ST1 are obtained as anode: 5 V, cathode: 0 V, gate: 3.7 V, thyristor ON conditions are obtained, and the transmitting thyristor ST1 turns on.

Even when ϕS is changed to 0 V in this state, the transmitting thyristor ST1 is still on and Va≅5 V is nearly obtained (when the thyristor turns on, the potential between the anode and the gate substantially becomes equal).

Therefore, even when ϕS is set to 0 V, the ON conditions of the first thyristor are held and a first shift operation is completed.

When ϕI signal of the light emitting thyristor to be inputted to an input terminal of image data ϕD in FIG. 3 is changed to 0 V from 5 V, the same conditions as conditions on which the transmitting thyristor turns on are obtained, the light emitting thyristor SL1 therefore turns on, and a first LED is lit.

For the first LED by resetting ϕI to 5 V, a potential difference between the anode and the cathode of the light emitting thyristor is eliminated, a thyristor minimum held current cannot be passed, and the LED therefore turns off by turning off the light emitting thyristor SL.

The transmitting of the thyristor ON conditions to ST2 from ST1 will next be described. Even when the light emitting thyristor SL1 turns off, ϕ1 stays at 0 V, the transmitting thyristor ST1 is therefore on, a gate voltage of the transmitting thyristor ST1 is nearly Va≅5 V, and Vb=3.7 V.

When ϕ2 is changed to 0 V from 5 V in this state, the potentials of the transmitting thyristor ST2 are obtained as anode: 5 V, cathode: 0 V, gate: 3.7 V, and the transmitting thyristor ST2 turns on.

After the transmitting thyristor ST2 turns on, by changing ϕ1 to 5 V from 0 V, the transmitting thyristor ST1 turns off in a similar manner as when the light emitting thyristor SL1 turns off.

The transmitting thyristor to turn on shifts to ST2 from ST1 in this manner. Subsequently, by changing ϕI to 0 V from 5 V, the light emitting thyristor SL2 turns on to emit light.

Additionally, a reason why only the light emitting thyristor whose transmitting thyristor turns on can emit light lies in that when the transmitting thyristor is not on, the gate voltage of the thyristor other than the thyristor adjacent to the thyristor having turned on is 0 V, and the thyristor ON conditions are not obtained.

Also for the adjacent thyristor, when the light emitting thyristor turns on, the potential of ϕI turns to 3.4 V (light emitting thyristor forward direction voltage fall amount), and the adjacent thyristor cannot turn on because there is no potential difference between the gate and the cathode.

Additionally, it has been described above that by setting ϕI to 0 V, the light emitting thyristor turns on to emit light, but in an actual print operation, it is naturally necessary to control whether or not to actually emit light at the timing in accordance with the image data ϕD.

The image data ϕD shown in FIGS. 3 and 4 is a signal indicating the aforementioned condition, and for ϕI terminal of SLED, a logical sum of ϕI and image signal is taken in the outside. Only when the image data is 0 V, the SLED ϕI terminal actually turns to 0 V to emit light. When the image data is 5 V, the SLED ϕI terminal stays at 5 V and no light is emitted.

(SLED Mounting State)

A case in which the conventional SLED described with reference to FIGS. 3 and 4 is mounted on an image forming apparatus will next be described with reference to FIG. 5.

FIG. 5 is a structure diagram of the image forming apparatus of an electrophotographic recording system, on which the SLED shown in FIG. 3 is mounted.

In FIG. 5, numeral 701 denotes an exposing portion with an SLED semiconductor chip mounted thereon, 702 denotes a photosensitive drum as a light receiving portion, 703 denotes a drum charging device, 704 denotes a developing device for attaching a toner, 705 denotes a transferring device for transferring the toner on the drum to a sheet 708 on a transferring belt 707, and 706 denotes a cleaner for removing the toner remaining on the photosensitive drum 702 after transferring.

For the exposing portion 701, an internal structure will next be described. Numeral 710 denotes an SLED array semiconductor chip, 711 denotes a ceramic base as a reference for laying a chip array, and 712 denotes an aluminum frame serving as an optical system reference.

Moreover, numeral 713 denotes Selfoc Lens Array (trade name, hereinafter referred to simply as SLA) having a focus on a light emitting spot array of the SLED array semiconductor chip 710 and on the photosensitive drum 702, 714 denotes an electrode for generating an electric field to prevent the toner from flying (details will be described later), 715 denotes a mold member for covering and supporting the aluminum frame 712 on the opposite side of the exposing portion 701, 716 denotes a power source for applying a direct-current voltage to the electrode 714, and 717 denotes a switch.

(Image Forming Process)

A flow of image formation onto the sheet 708 will next be described. First, the drum charging device 703 uniformly applies a negative charge onto the photosensitive drum 702.

Subsequently, the surface of the photosensitive drum 702 is exposed to light in accordance with an image pattern by the exposing portion 701, and an electrostatic latent image is formed. Next the developing device 704 applies a negatively charged toner to the electrostatic latent image, attaches the toner to a portion exposed to light by the exposing portion 701, and forms a toner image on the photosensitive drum 702.

Subsequently, the transferring device 705 transfers the toner image onto the sheet 708, and forms the toner image on the sheet 708.

After transferring, the cleaner 706 wipes off the remaining toner from the photosensitive drum 702, and the flow returns to a charging process.

(Flying and Preventing)

The toner flying will next be described. When the remaining toner is insufficiently collected by the cleaner 706 in the electrophotographic process, the toner as charged particles remains on the photosensitive drum 702, and the flow shifts to the next process as it is.

Here by an electrostatic field distribution formed on the photosensitive drum 702 passed under the drum charging device 703 and exposed to light by the exposing portion 701, the remaining toner whose potential is unstable on the photosensitive drum 702 leaves the photosensitive drum 702 and flies, and adheres to the surface of SLA 713. It is seen that the toner deteriorates the subsequent exposing state and causes image defects.

The exposing portion 701 shown in FIG. 5 will next be described in more detail with reference to FIG. 6. FIG. 6 is an enlarged view of the exposing portion in FIG. 5, and shows means for preventing exposure defect by toner flying.

In FIG. 6, numeral 802 denotes a photosensitive drum, 810 denotes an SLED array semiconductor chip, 811 denotes a ceramic base as a reference for laying a chip array, 812 denotes an aluminum frame as an optical system reference, 813 denotes SLA, and 815 denotes a mold member for covering and supporting the exposing portion.

Moreover, numeral 816 denotes a power source for a flying preventing electrode 814, and 817 denotes a switch. Furthermore, by disposing the electrode 814 for preventing the residual toner from flying, and generating a negative electric field, the scattered residual toner is prevented from flying to the SLA 813.

Numeral 818 denotes scattered charged particles (toner). FIG. 6 schematically shows that the charged particles 818 change tracks by the electric field of the flying preventing electrode 814 and fail to adhere to the SLA 813.

(SLED Destruction by Mold and Electrostatic Discharge)

On the other hand, in the conventional art shown in FIG. 6, there is a problem that electrostatic destruction of the SLED array semiconductor chip 810 with a low electrostatic pressure resistance easily occurs in the flying preventing electrode 814.

Specifically, when the switch 817 turns off, and static electricity discharge occurs in the flying preventing electrode 814 from the outside, current flows via the surface of the mold member 815 and the destruction of the SLED array semiconductor chip 810 sometimes occurs (hereinafter, the static electricity discharge occurs when the switch 817 is off and no voltage is applied to the flying preventing electrode 814).

Specifically, the static electricity discharge is caused, for example, by human body contact with the electrode 814 or the like. The static electricity discharge may also occur in the aluminum frame 812, but the aluminum frame 812 is subjected to sufficient grounding, and therefore the destruction of the SLED array semiconductor chip 810 by the static electricity discharge does not result.

(Countermeasure against Static Electricity Discharge Accident of Conventional System)

The following means has been heretofore used to solve the problem. One means comprises replacing the mold member 815 with a member which is more difficult to energize, and preventing electricity from being discharged to the chip.

Another means comprises replacing the mold member 815 with a metal or another member which can easily be energized, sufficiently grounding the member similarly as the aluminum frame 812, and partially placing individual insulators between the member and the electrode 814.

This means will be described with reference to FIG. 7. FIG. 7 is a schematic view showing the conventional SLED countermeasure against the static electricity discharge.

In FIG. 7, since members denoted by numerals 910 to 914, 816, 817 are similar to the corresponding members shown in FIG. 6, the description thereof is omitted.

Moreover, 916 denotes a metal cover fixed to an aluminum frame 912, and 915 denotes an insulation member for insulation between the metal cover 916 and electrode 914.

According to the constitution shown in FIG. 7, in the conventional apparatus, the SLED array semiconductor chip can be protected from the static electricity discharge.

However, for the means using the member difficult to energize in the conventional art, there is a problem that the material and surface processing become expensive as compared with the mold member.

Moreover, for the means in which the easily energized member is used and grounded, two members, that is, the insulation member and metal member are used, an assembly process is added, and there is also a problem that the metal member is more expensive than the mold member.

Furthermore, since the electrode is disposed in the vicinity of the photosensitive drum, during application of a bias voltage to the electrode by the power source, spark discharge supposedly occurs between the electrode and the photosensitive drum.

SUMMARY OF THE INVENTION

The present invention has been developed to solve the aforementioned problem, and an object thereof is to provide an image exposure apparatus in which failure of an LED chip can be prevented, and an image forming apparatus.

Another object of the present invention is to provide an image exposure apparatus in which destruction of the LED chip by static electricity can be prevented, and an image forming apparatus.

Further object of the present invention is to provide an image exposure apparatus and an image forming apparatus in which toner is prevented from adhering to a lens and failure of LED chip can be prevented.

Still another object of the present invention is to provide an image exposure apparatus and an image forming apparatus in which spark discharge is inhibited from occurring between an electrode and a photosensitive body.

Still further object of the present invention is to provide an image exposure apparatus comprising:

a light emitting chip including a plurality of light emitting elements;

a base plate for mounting the chip thereon;

a lens for imaging light emitted from the plurality of light emitting elements on an exposure surface;

an electrode disposed in the vicinity of the lens; and an insulative protecting member for protecting the chip, wherein a gap is provided between the electrode and the protecting member, and to provide an image forming apparatus provided with the image exposure apparatus.

Still further object of the present invention is to provide an image exposure apparatus comprising:

a light emitting chip including a plurality of light emitting elements;

a base plate for mounting the chip is mounted;

a lens for imaging light emitted from the plurality of light emitting elements on an exposure surface;

an electrode disposed in the vicinity of the lens; and an insulative protecting member for protecting the chip, wherein a surface of the electrode is covered with an insulation layer, and to provide an image forming apparatus provided with the image exposure apparatus.

Further objects of the present invention will be apparent upon reading the following detailed description with reference to accompanying drawings.

DETAILED DESCRIPTION OF THE PREFERRED EMBODIMENTS

Preferred embodiments of the present invention will be described hereinafter in detail with reference to the drawings. Additionally, for constituting components described in the embodiment, sizes, materials, shapes and relative arrangement, and the like do not limit the scope of the present invention unless otherwise described.

First, an LED array apparatus and an image forming apparatus of the present invention according to one embodiment of the present invention will be described with reference to FIGS. 1 and 2.

Figure 1:
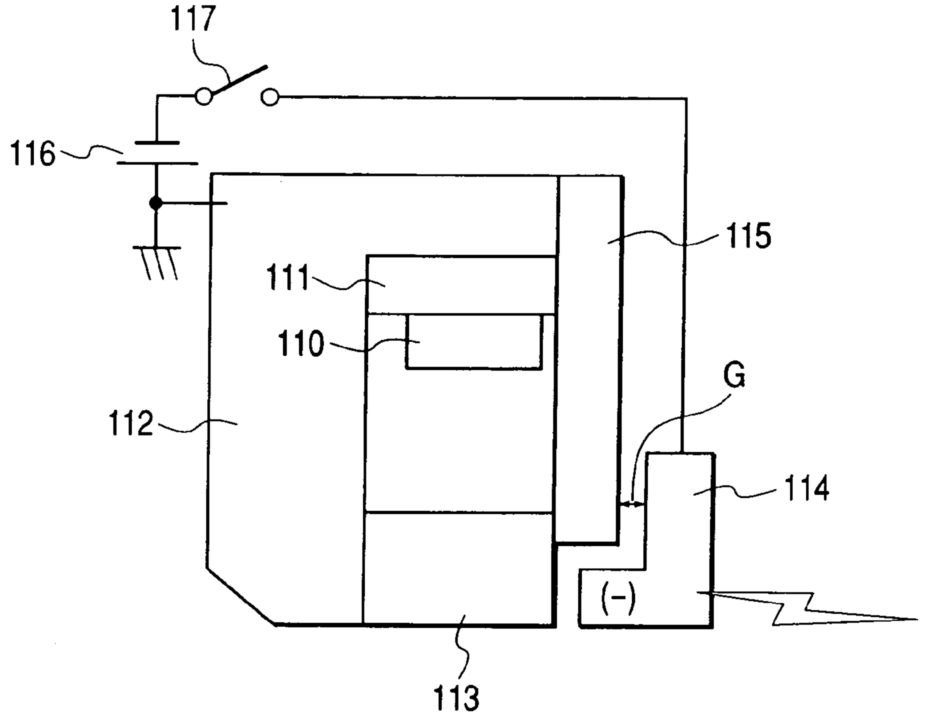
FIG. 1 is a sectional view of an exposing portion according to one embodiment of an LED array apparatus of the present invention.

FIG. 1 shows characteristics of the present invention most clearly, and is a sectional view of an exposing portion according to one embodiment of the LED array apparatus of the present invention.

In FIG. 1, 110 denotes an LED array semiconductor chip in which a plurality of LEDs are formed (SLED array semiconductor chip), 111 denotes a ceramic base as a reference for laying a plurality of chips, and 112 denotes an aluminum frame as an optical reference.

Moreover, numeral 113 denotes an SLA as a lens array, 114 denotes an electrode as an electrode portion for generating a toner flying preventing electric field, 115 denotes a mold member for covering and supporting the exposing portion as an insulation member, 116 denotes a power source for the flying preventing electrode 114, and 117 denotes a power switch.

As shown in FIG. 1, an air gap G of 1 to 2 mm is made between the electrode 114 and the mold member 115. Additionally, in the LED array apparatus of the present invention, the air gap G is not limited to the range of 1 to 2 mm, and any other appropriate value may be set.

Figure 3:
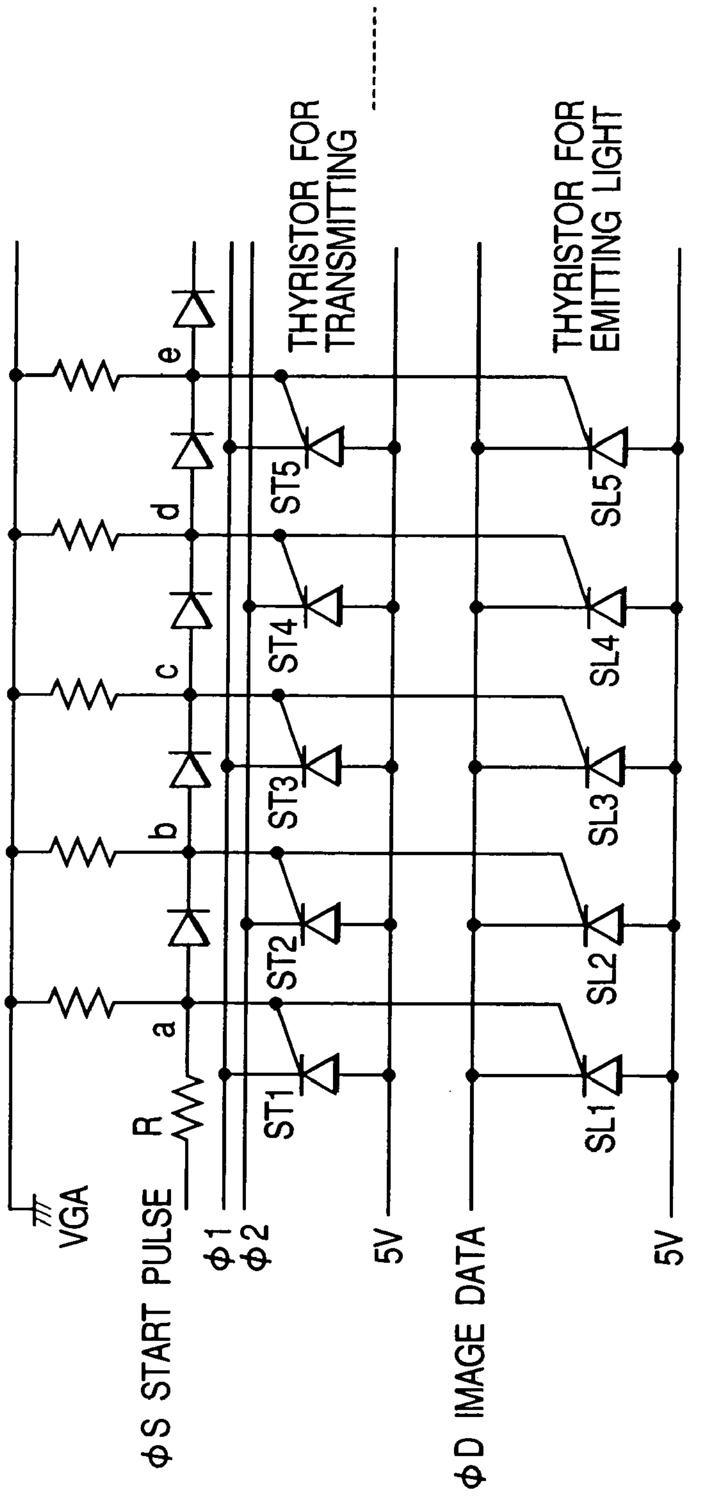
FIG. 3 is a partial circuit diagram of SLED.
Figure 4:
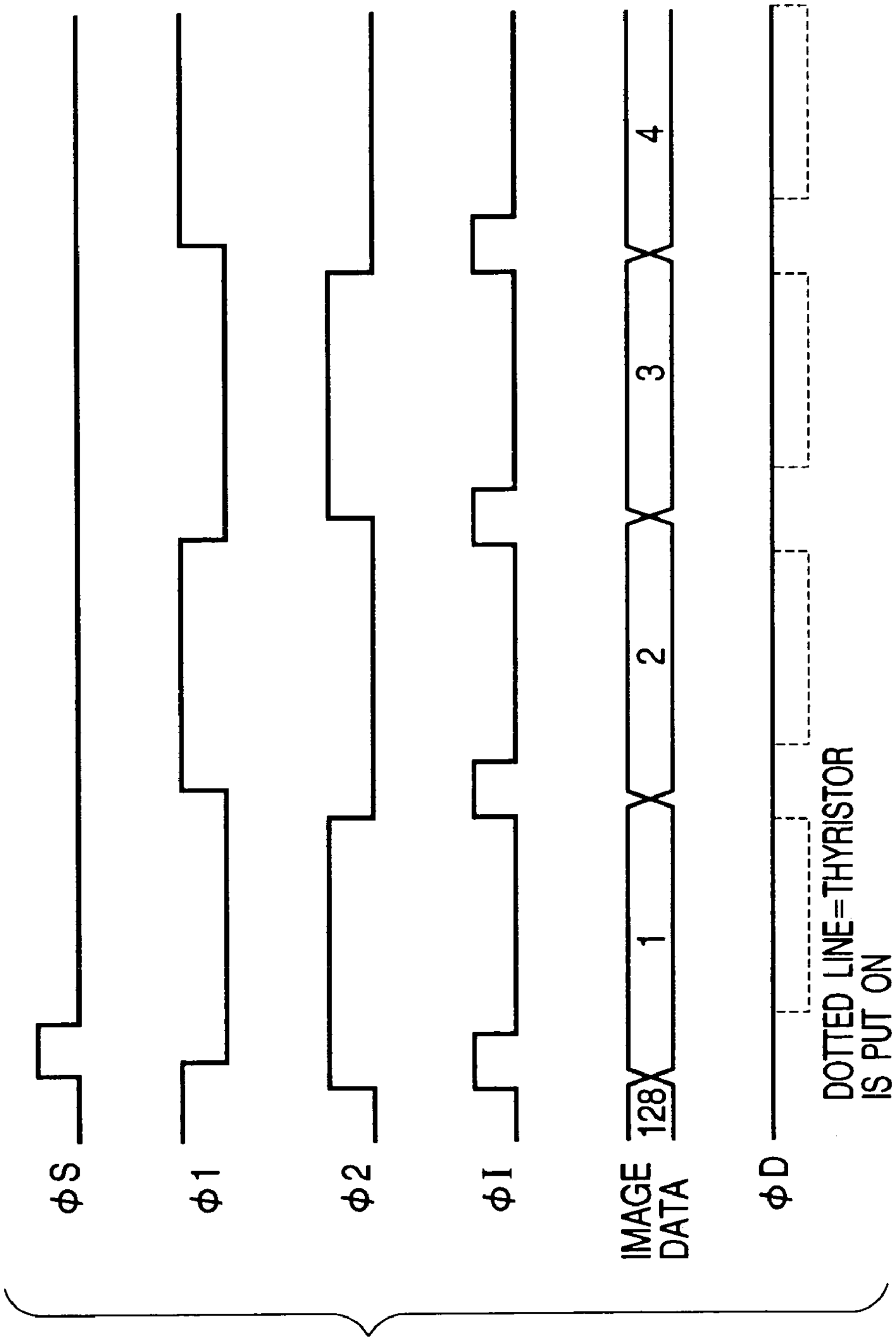
FIG. 4 is a timing chart of a signal for controlling the SLED shown in FIG. 3.
Figure 5:
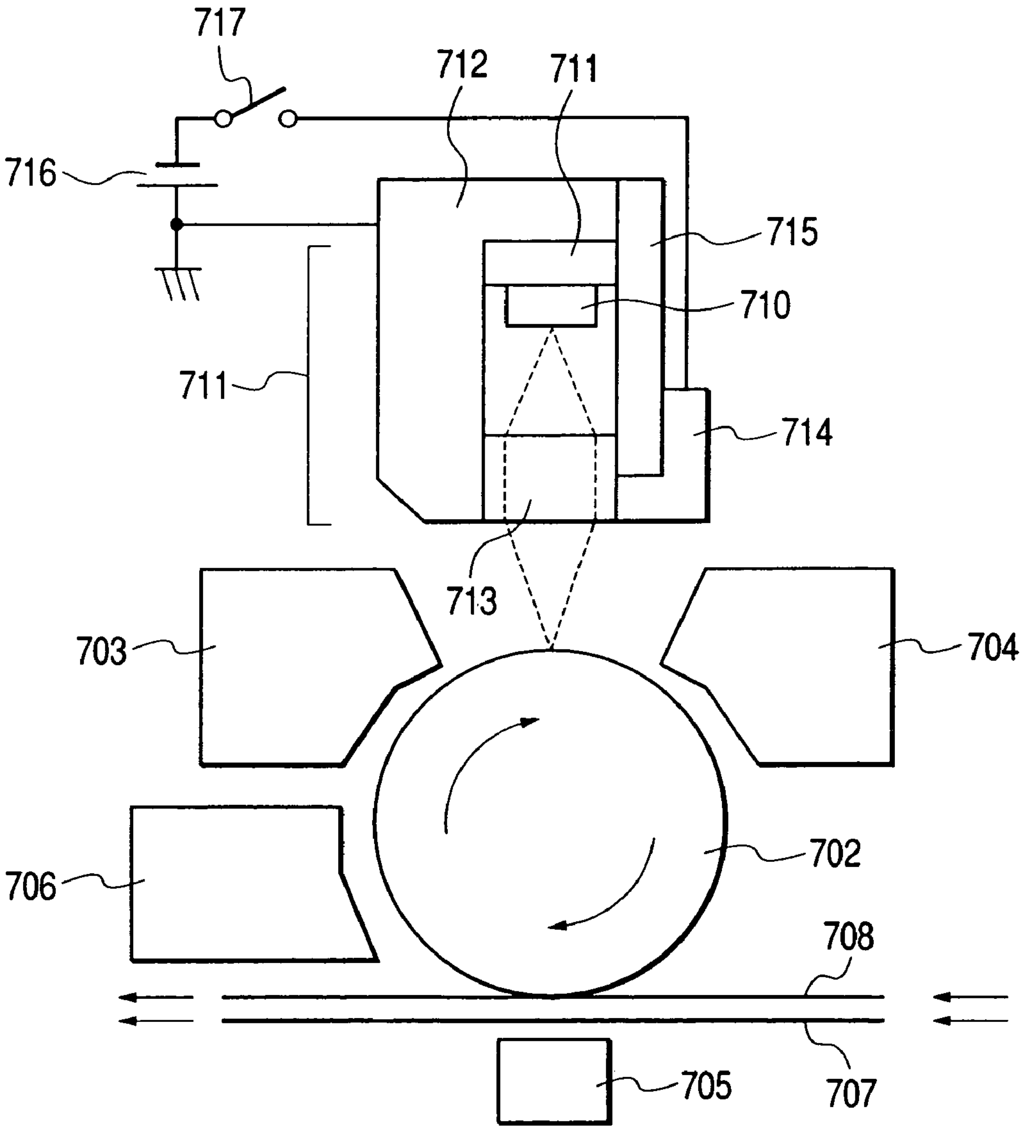
FIG. 5 is a structure diagram of an image forming apparatus of an electrophotographic recording system on which the SLED shown in FIG. 3 is mounted.
Figure 6:
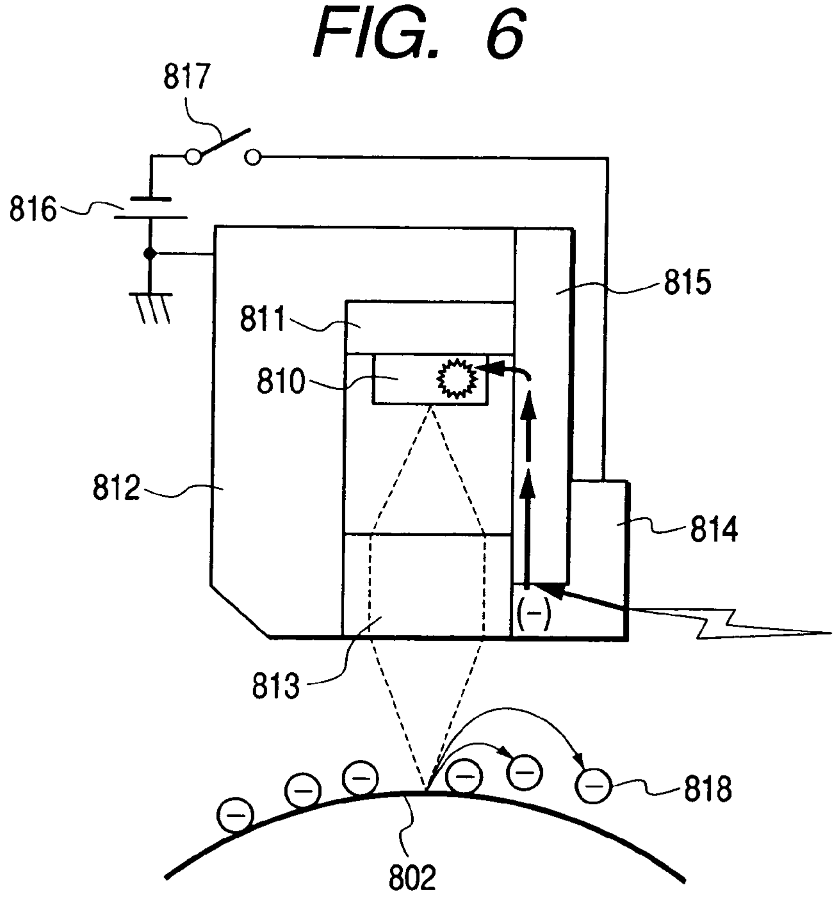
FIG. 6 is an enlarged view of the exposing portion of the image forming apparatus shown in FIG. 5.
Figure 7:
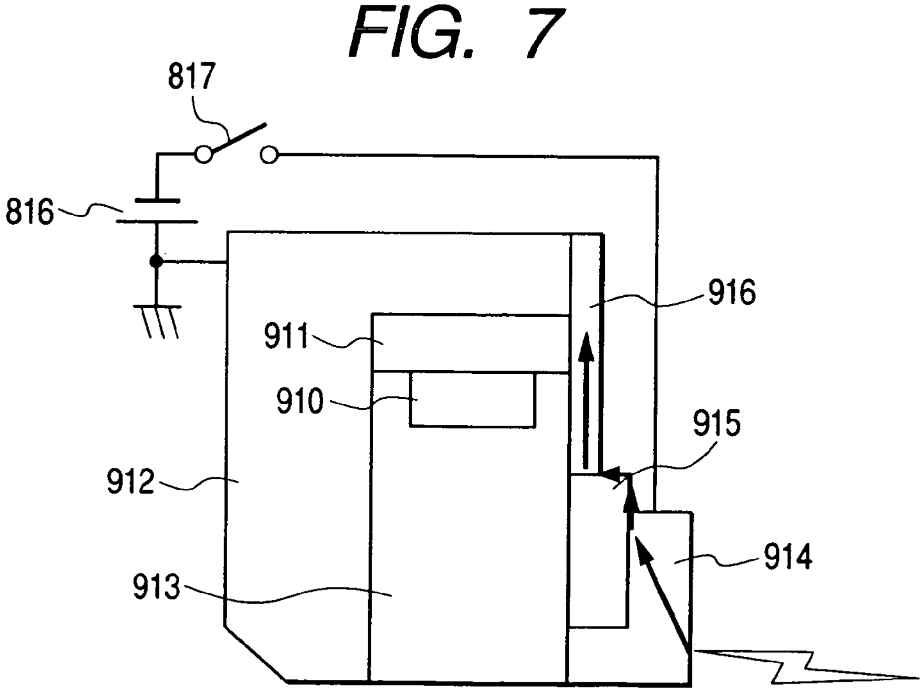
FIG. 7 is a schematic view showing a countermeasure against static electricity discharge for a conventional SLED.

Here, for the SLED array semiconductor chip 110, since a circuit and light emitting operation are similar to those described in the conventional art with reference to FIGS. 3 and 4, detailed description thereof is omitted.

Specifically, in FIG. 3, a portion to which $\phi$1 and $\phi$2 are inputted is a control signal input portion, a portion to which $\phi$D is inputted is a light emitting control signal input portion, a portion to which $\phi$S is inputted is a start signal input portion, a portion to which a 5 V voltage is inputted is a positive electrode side power source input portion, and a portion to which VGA is inputted is a negative electrode side power source input portion.

Figure 2:
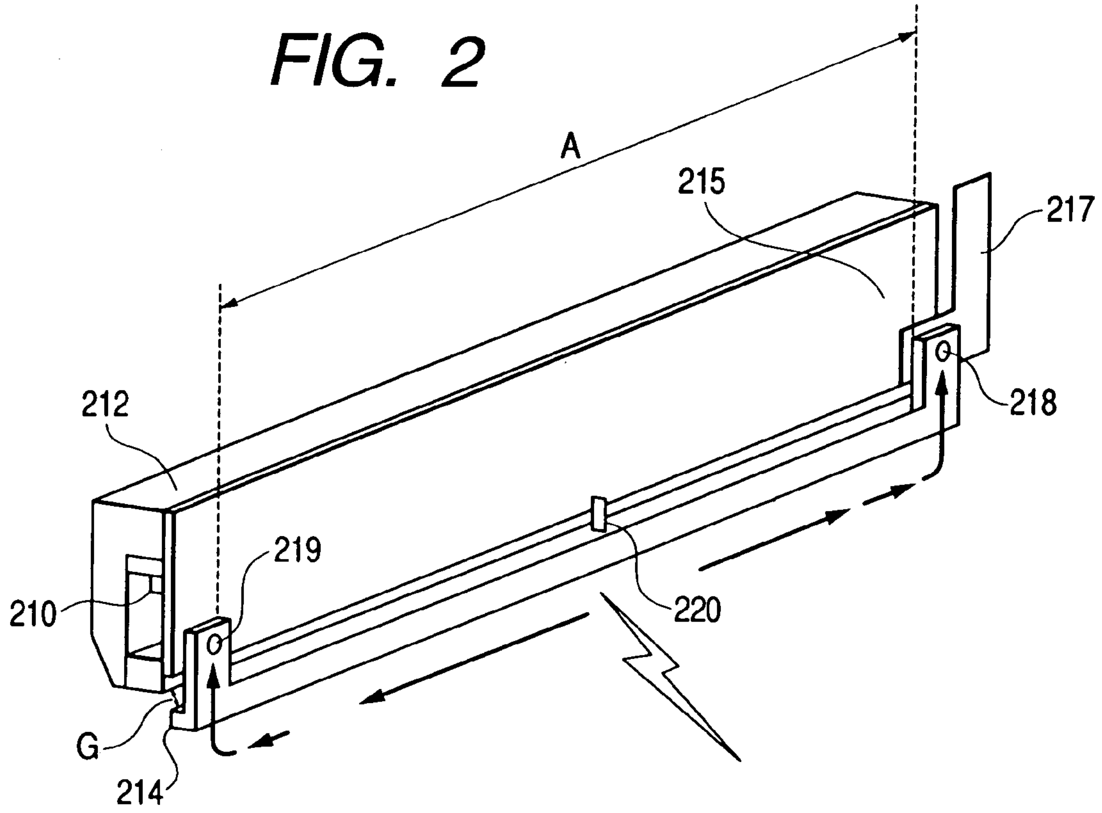
FIG. 2 is a perspective view as seen from a mold member of the exposing portion shown in FIG. 1.

Moreover, FIG. 2 is a perspective view from the side of the mold member 115 of the exposing portion shown in FIG. 1. In FIG. 2, numeral 210 denotes an SLED array semiconductor chip, 212 denotes an aluminum frame, 214 denotes an electrode as an electrode portion for generating an electric field to prevent a toner from flying, and 215 denotes a mold member as an insulation member for covering and supporting the exposing portion.

Furthermore, the electrode 214 is fixed to the mold member 215 in opposite ends 218, 219. Positions in which the opposite ends of this electrode 214 are attached to the mold member 215 are outside a mounting area A of the SLED array semiconductor chip 210 (FIG. 2). Numeral 217 denotes a wire drawn from the electrode 214, and the wire is actually connected as in the switch 117 and the power source 116.

By fixing the opposite ends of the electrode 214 to the mold member 215, and disposing the air gap G, with accidental occurrence of static electricity discharge in the electrode 214, direct discharge to the SLED array semiconductor chip 210 from the electrode 214 does not easily occur, and an electric charge is conducted to the mold member 215 and aluminum frame 212 via the opposite ends 218, 219, and discharged to a ground point. Particularly, as in the present embodiment, when the attaching position of the electrode 214 is set outside the mounting area of the SLED array semiconductor chip 210, the discharge to the chip 210 can more securely be prevented.

Moreover, in FIG. 2, numeral 220 denotes a protrusion as a convex portion of the mold member 215, and the protrusion is not in contact with the electrode 214, but is disposed to prevent the electrode 214 from being bent by a stress from the outside of the exposing portion.

Therefore, in one embodiment of the LED array apparatus of the present invention, as shown in FIG. 1, the electrode 114 is connected to the mold member 115 via the air gap, and destruction of the SLED array semiconductor chip 110 by static electricity discharge can effectively be prevented.

Here, in the aforementioned embodiment, the embodiment of the LED array apparatus has been described, but the aforementioned LED array apparatus can be applied to the image forming apparatus.

Specifically, there is provided a copying machine, a printer or another apparatus in which a lighting portion or the like for irradiating an original is disposed as image reading means for reading an image from the original or the like, the aforementioned LED array apparatus emits light based on image information read from the original, and a latent image is formed on an image bearer or the like based on the emitted light.

Specifically, such image forming apparatus constitutes one embodiment of the image forming apparatus of the present invention. Even in this image forming apparatus, it is obvious that an effect similar to that of the aforementioned embodiment of the LED array apparatus of the present invention can be obtained.

An embodiment in which spark discharge is inhibited from occurring between an electrode and a photosensitive body will next be described.

Figure 10:
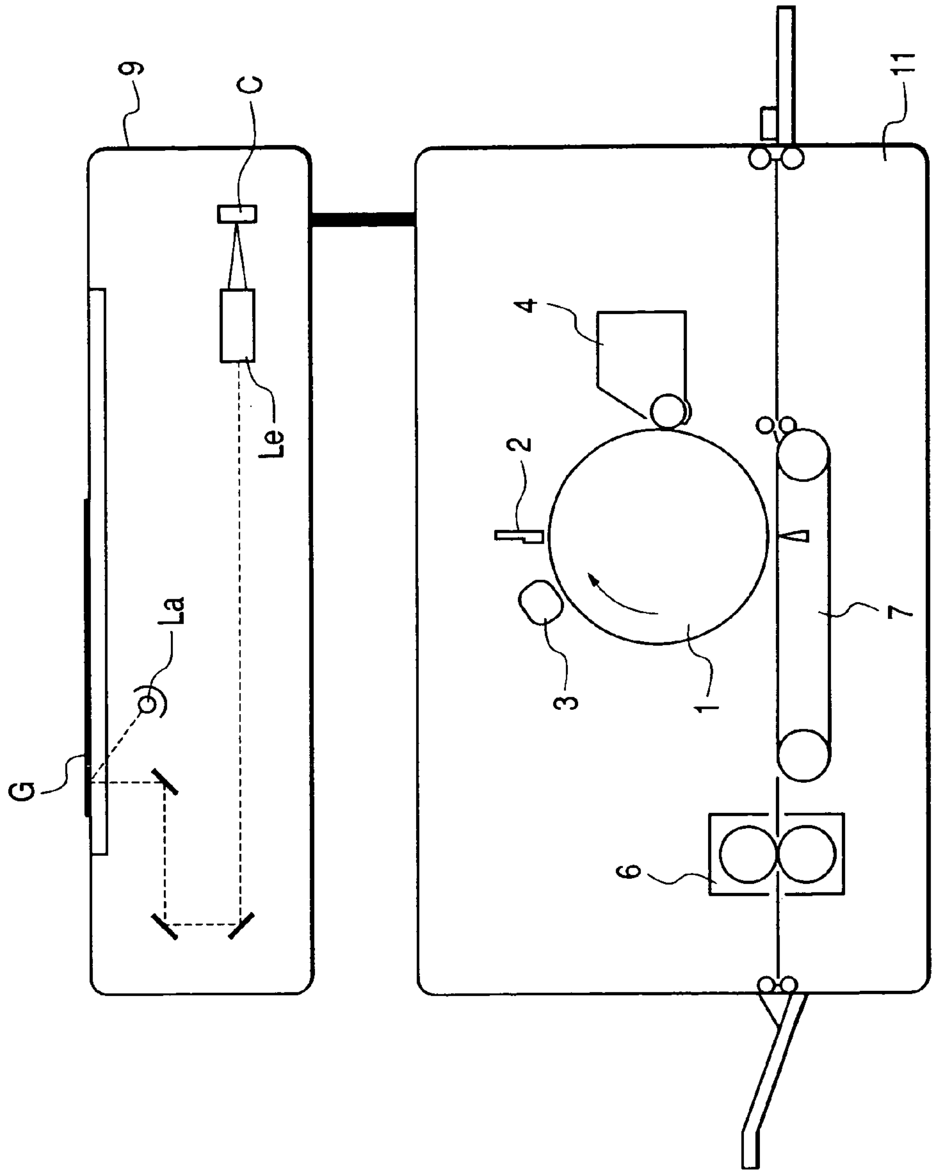
FIG. 10 is a sectional view of the image forming apparatus using LED exposing means.
Figure 11:
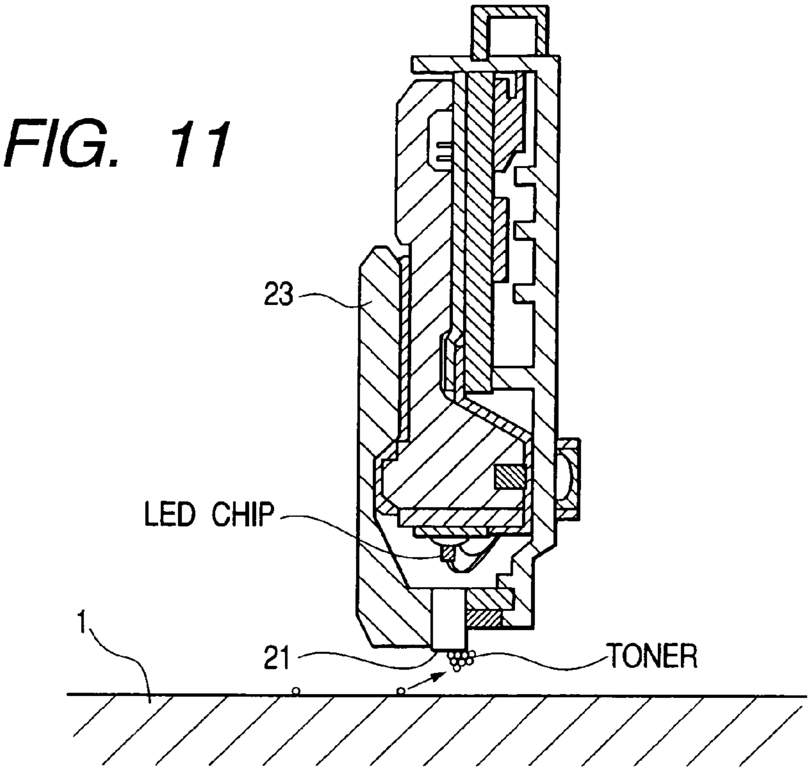
FIG. 11 is a view showing that toner adheres to an LED head exposure surface.
Figure 12:
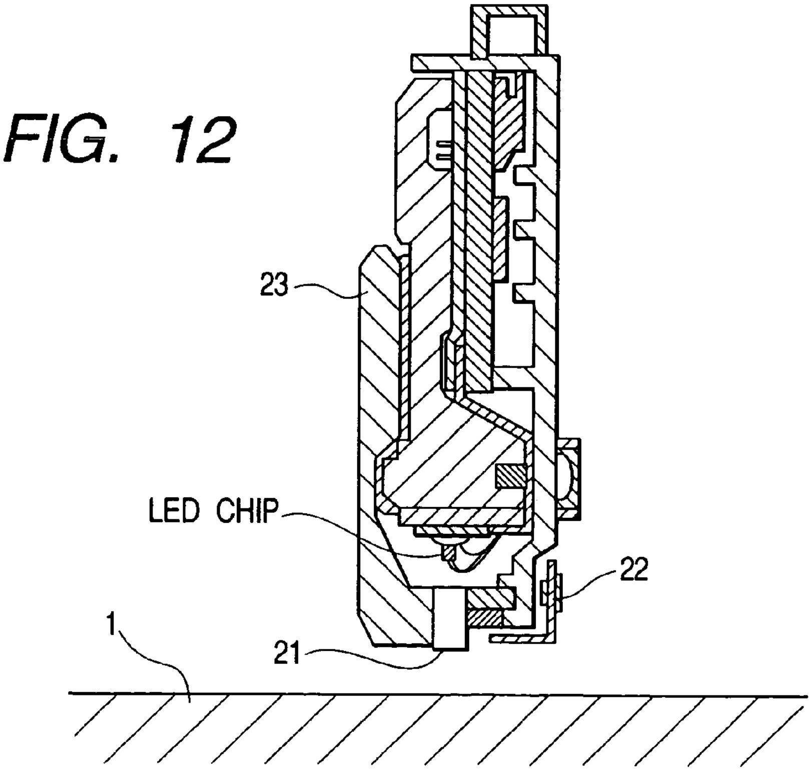
FIG. 12 is a view showing that a conductive member is disposed in the vicinity of the exposure surface in order to prevent the toner from adhering to the exposure surface of the LED head.

Additionally, FIGS. 10, 11, 12 show reference examples for use in the description of the present embodiment.

In the image forming apparatus shown in FIG. 10, when a copy start signal is inputted, a photosensitive drum 1 is charged by a charging device 3 to provide a predetermined potential. On the other hand, the original G laid on an original stand 10 is read by a reader unit 9 including an original irradiating lamp La, short focal lens array Le, and CCD sensor C. The CCD sensor C is constituted of a light receiving portion, transmitting portion, and output portion. A light signal is changed to a charge signal in the CCD light receiving portion, the charge signal is successively transmitted to the output portion in synchronization with a clock pulse by the transmitting portion, and the charge signal is converted to a voltage signal, amplified, reduced in impedance, and outputted by the output portion. The obtained analog signal is subjected to a known image processing, converted to a digital signal and transmitted to a printer unit 11. The printer unit 11 receives the image signal, and LED in an LED head 2 emits light.

Subsequently, this electrostatic latent image is developed in a developing device 4 which contains a so-called two-component developer containing toner particles and carrier particles, and a toner image is obtained on the photosensitive drum 1.

The toner image formed on the photosensitive drum 1 in this manner is electrostatically transferred to a transferring material by a transferring device 7. Thereafter, the transferring material is electrostatically separated, conveyed to a fixing device 6, and thermally fixed, and an image is outputted.

Additionally, in recent years an apparatus of a system of placing a contact charging apparatus as a charging member for applying a voltage in contact with a body to be charged to charge the body has been put in practical use because of low ozone, low power, and other advantages.

As the charging member of this system, a magnetic brush apparatus is preferably used because of stable charging contact.

In the contact charging apparatus of the magnetic brush system, conductive magnetic particles are magnetically bound directly on a magnet, or a sleeve incorporating the magnet, stopped, or rotated, and placed in contact with the body to be charged, and charging is started by applying the voltage.

Moreover, a member constituted by forming a conductive fiber on a brush (hereinafter referred to as a fur brush), or a conductive rubber roller constituted by forming conductive rubber in a roller shape is also preferably used as the contact charging member.

Particularly, by using the contact charging member, and using a body constituted by forming a surface layer with conductive fine particles dispersed therein on a usual organic photosensitive body, an amorphous silicon photosensitive body or the like as the body to be charged, a charging potential substantially equal to the potential of a direct-current component of the bias applied to the contact charging member can be obtained on the surface of the body to be charged. This charging method is referred to as injection charging. When the injection charging is used, a discharge phenomenon for charging the body to be charged using a corona charging device is not utilized, a completely ozone-less and low power consumption charging is possible, and the injection charging has been noted.

In a cleanerless image forming apparatus, provided with the aforementioned magnetic brush charging device, for performing cleaning simultaneous with developing, when an LED array head is used as exposing means, the drum is disposed in the vicinity of the exposure surface, the transfer residual toner once collected by the magnetic brush charging device, adjusted in polarity and discharged flies to the exposure surface from the drum with a change in potential distribution on the drum caused by the next image exposing process, and adheres to the exposure apparatus, which disadvantageously causes image defects (FIG. 11). Therefore, as shown in FIG. 12, it is also proposed to dispose a conductive member 22 (electrode) parallel to and adjacent to the exposure apparatus, apply to the conductive member a bias which has the same polarity and the same or more absolute value as those of an image bearer surface potential after the charging process, and to prevent the toner discharged from the image bearer surface by exposure from being scattered.

However, since the conductive member is disposed in the vicinity of the drum, there is a problem that spark discharge occurs between the conductive member and the drum by accumulated paper powder, toner, and the like and that the drum is damaged.

To solve the problem, in the present embodiment, an insulation layer is disposed on the surface of the conductive member (electrode). This respect will be described hereinafter with reference to the drawings.

Figure 8:
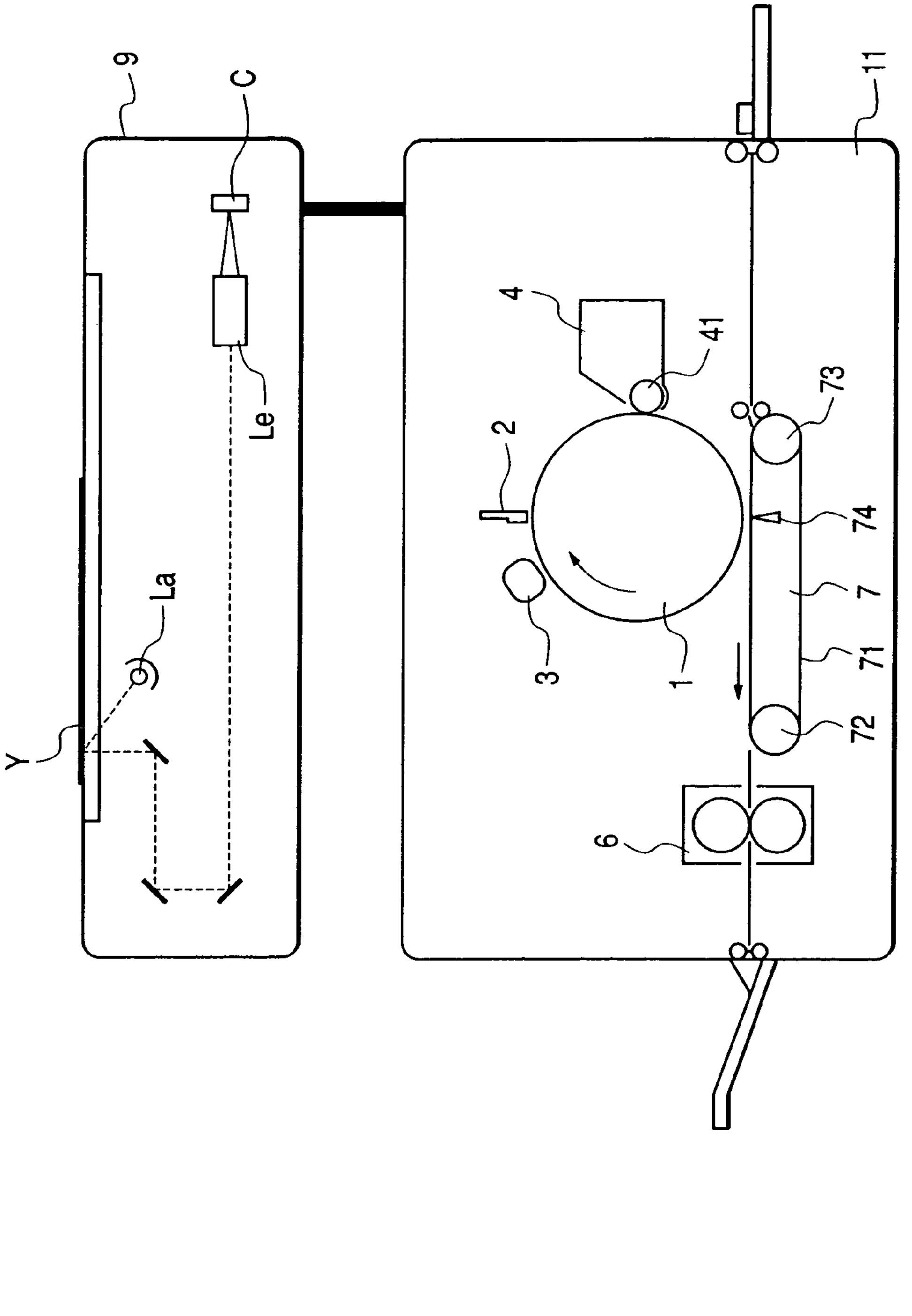
FIG. 8 is a sectional view of the image forming apparatus for use in the embodiment of the present invention.

FIG. 8 is a schematic sectional view of an image forming apparatus in which the LED head of the present embodiment is used.

Here, the reader unit 9 reads an original Y by a CCD, and the image by the CCD is converted to an electric signal and outputted to the LED head 2 of the printer unit 11.

Here, an LED array writer head is used as exposing means 2 as latent image forming means.

In the present embodiment, the magnetic brush charging device 3 using a magnetic carrier is used as charging means, and the charging magnetic carrier is preferably provided with an average particle diameter of 10 to 100 μm, saturation magnetization of 20 to 250 emu/cm$^3$ ($8\pi\times10^{-3}$ to $\pi\times10^{-1}$ wb/m$^2$) and resistance of $1\times10^2$ to $1\times10^{10}$ Ω·cm. Considering that insulation defects such as a pin hole are present in the photosensitive drum, a resistance of $1\times10^6$ Ω·cm or more is preferable. Since the resistance is preferably as small as possible in order to enhance a charging property, the magnetic particles provided with an average particle diameter of 25 μm, saturation magnetization of 200 emu/cm$^3$ ($200\times4\pi\times10^{-4}=8\pi\times10^{-2}$ wb/m$^2$) and resistance of $5\times10^6$ Ω·cm are used in the present embodiment. For the charging magnetic carrier used in the present embodiment, a ferrite surface is subjected to an oxidation and reduction process and the resistance is adjusted.

Here, as the photosensitive drum 1 for use in the present embodiment, a usually used organic photosensitive body or the like can be used, but preferably, use of the organic photosensitive body provided with a surface layer of a material having a resistance of $10^2$ to $10^{14}$ Ω·cm or use of an amorphous silicon photosensitive body can realize charge injection charging, effectively prevents ozone generation, and effectively reduces power consumption. Moreover, the charging property can also be enhanced. In the present embodiment, the photosensitive drum 1 is a negatively charged organic photosensitive body, and is constituted by forming the following first to fifth layers in order from below on an aluminum drum base with a diameter of 30 mm.

The first layer is an undercoating layer, and is an electrically conductive layer with a thickness of 20 μm disposed to smooth defects and the like of the drum base (hereinafter referred to as the aluminum base).

The second layer is a positive charge injection preventive layer, plays a role of preventing a positive charge injected from the aluminum base from canceling a negative charge on the photosensitive body surface, and is a 1 μm thick medium-resistance layer whose resistance is adjusted to provide about $1\times10^6$ Ω·cm by amylane resin and methoxymethyl nylon.

The third layer is a charge producing layer, further an about 0.3 μm thick layer in which a disazo-based pigment is dispersed in resin, and produces a pair of positive and negative charges by being exposed to light.

The fourth layer is a charge transporting layer constituted by dispersing hydrazone in polycarbonate resin, and is a P-type semiconductor. Therefore, the negative charge on the photosensitive body surface cannot move in this layer and only the positive charge produced in the charge producing layer can be transported to the photosensitive body surface.

The fifth layer is a charge injecting layer, and is a coated layer of a material in which $SnO_2$ microfine particles are dispersed in an insulation resin binder. Specifically, insulation resin is doped with antimony as an insulation filler provided with light transmission properties, and low-resistance (electrically conductive) $SnO_2$ particles with a particle diameter of 0.03 μm are dispersed in resin by 70% by weight.

A coating liquid prepared in this manner is applied in a thickness of about 3 μm to form the charge injecting layer by appropriate coating methods such as dipping, spraying, rolling, and beaming. A surface resistance is $10^{13}$ Ω·CM. A charging property is directly enhanced and a high-grade image can be obtained by controlling the surface resistance in this manner. The photosensitive body can be realized not only by OPC but also a-Si drum, and higher durability can be realized.

Here, for the surface layer a volume resistance indicates a value measured by disposing metal electrodes at an interval of 200 μm, passing a surface layer preparation liquid therebetween to form a film, and applying a voltage of 100 V between the electrodes. The value is measured under conditions: a temperature of 23° C.; and a humidity of 50% RH.

A developing process will next be described.

A developing method is generally roughly classified into four: a method (mono-component non-contact developing method) of coating a sleeve with a nonmagnetic toner with a blade or the like, or with a magnetic toner by a magnetic force, carrying the toner, and developing an image in a non-contact state with the photosensitive drum; a method (mono-component contact developing method) of developing the image while the toner coated as described above is in contact with the photosensitive drum; a method (two-component contact developing method) of using toner particles mixed with the magnetic carrier as a developer, carrying the developer by the magnetic force and developing the image in the contact state with respect to the photosensitive drum; and a method (two-component non-contact developing method) of developing the image while the two-component developer is in the non-contact state. In view of enhanced quality and stability of the image, the two-component contact developing method is frequently used.

A developing sleeve 41 is disposed so that an area closest to the photosensitive drum 1 is about 500 μm at least during developing, and developing is possible in a state in which the developer is in contact with the photosensitive drum 1. For the two-component developer for use in the present embodiment, the toner particles for use are obtained by applying, from the outside, titanium oxide with an average particle diameter of 20 nm at a weight ratio of 1.0% to a negative charging toner with an average particle diameter of 6 μm, and the developing magnetic carrier with a saturation magnetization of 205 emu/cm$^3$ ($205\times4\pi\times10^{-4}=8.2\pi\times10^{-2}$ wb/m$^2$) and an average particle diameter of 35 μm is used. Moreover, the developer obtained by mixing the toner and the developing magnetic carrier at a weight ratio of 6:94 is used. In this case, the toner in the developer is provided with a triboelectric charge amount of about $-25\times10^{-3}$ C./kg.

The direct-current voltage and alternating-current voltage are applied to the developing sleeve 41 from a power source (not shown), and in the present embodiment, −480 V as the direct-current voltage, and Vpp=1500 V, Vf=3000 Hz as the alternating-current voltage are applied. Usually in the two-component developing method, when the alternating-current voltage is applied, developing efficiency increases, the image is high-graded, but conversely there is a danger that fog easily occurs. Therefore, the fog is usually prevented by making a potential difference between the direct-current voltage applied to the developing device 4 and the surface potential of the photosensitive drum 1. Such fog preventing potential difference is called a fog removing potential Vback, but this potential difference prevents the toner from adhering to a non-image area during developing.

This toner image is then transferred to a recording material by the transferring device 7. In the transferring device 7 an endless belt 71 is extended between a driving roller 72 and a driven roller 73 and rotated in an arrow direction in FIG. 8. Furthermore, in the transferring device 7, a transferring and charging blade 74 is disposed. For the transferring and charging blade, a pressurizing force is generated toward the photosensitive drum 1 from the inside of the belt 71, power is supplied from a high-voltage power source, the charging with a polarity reverse to the polarity of the toner is performed from the backside of the recording material and the toner image on the photosensitive drum 1 is successively transferred to the top surface of the recording material.

Here, the recording material is conveyed to a transferring portion formed by the photosensitive drum 1 and belt 71 from a sheet feeding and conveying apparatus in synchronization with rotation of the photosensitive drum 1 with an adequate timing. Moreover, in the present embodiment, the belt 71 is formed of polyimide resin with a film thickness of 75 μm. The material of the belt 71 is not limited to polyimide resin, and plastics such as polycarbonate resin, polyethylene terephthalate resin, polyvinylidene fluoride, polyethylene naphthalate resin, polyether ether ketone resin, polyether sulfone resin, and polyurethane resin, and fluorine-based or silicon-based rubber can preferably be used. Moreover, the thickness is not limited to 75 μm, and a range of 25 to 2000 μm, preferably 50 to 150 μm can preferably be used.

Furthermore, the transferring and charging blade 74 with a resistance of $1\times10^5$ to $1\times10^7$ Ω is used. A bias of +15 μA is applied to the transferring and charging blade 74 by a constant-current control and transferring is performed.

The toner image formed on the photosensitive drum 1 in this manner is electrostatically transferred onto the recording material by the transferring and charging blade 74. Thereafter, the transferring material is conveyed to the fixing device 6, and the thermally fixed image is outputted.

On the other hand, transfer residual toner remains on the photosensitive drum 1 after a transferring process. Here, for the transfer residual toner on the photosensitive drum 1, in many cases, toners with positive and negative polarities are mixed by stripping discharge during transferring. The transfer residual toner with the mixed polarity is conveyed to the magnetic brush charging device 3, mixed with magnetic particles in the charging device, all charged to provide the negative polarity, and discharged onto the photosensitive drum. In this case, when only the direct-current voltage is applied to the charging magnetic brush, the toner is insufficiently taken into the charging device. When the alternating-current voltage is applied to the magnetic brush charging device 3, however, the toner is easily taken into the charging device by a vibrating effect by an electric field between the photosensitive drum and the charging device. The transfer residual toner adjusted in polarity by the charging device and discharged onto the photosensitive drum is collected into the developing device by a fog removing electric field during developing. Here, when an image area in a rotation direction is longer than the peripheral length of the photosensitive drum 1, collecting simultaneous with developing is performed simultaneously with image forming processes such as charging, exposing, developing and transferring. Thereby, since the transfer residual toner is collected and also used for the next processes, waste toner can be eliminated. Moreover, large advantages are also provided in respect of space, and remarkable miniaturization is possible.

However, as shown in FIG. 11, in the cleanerless apparatus for utilizing the magnetic brush charging device to perform cleaning simultaneous with developing, a phenomenon (hereinafter referring to exposure flying) occurs in which during exposing by the exposing apparatus 2 in the next process, the transfer residual toner recovered by the magnetic brush charging device 3 and discharged onto the photosensitive drum 1 flies and adheres to an exposure surface 21 by the electric field attracted toward the exposure surface from the drum surface with a change of photosensitive drum surface potential. The exposure flying supposedly occurs when the drum surface potential distribution is subjected to exposure to change. Therefore, the present inventors conducted an experiment comprising: forcibly mixing 4% of toner into the magnetic brush charging device 3 in the constitution for use in the present embodiment, and performing solid exposure on the entire surface while forcibly discharging the toner. This experiment was set so that no developing agent was placed in the developing device 4, and neither driving of the developing device 4 nor applying of the bias is performed. Subsequently, by setting a photosensitive drum surface potential after charging (hereinafter referred to as Vd) to be constant at −800 V, and changing a photosensitive drum surface potential after exposing (hereinafter referred to as V1), a difference between Vd and V1, that is, a latent image contrast was change and the experiment was performed. As a result of the experiment, it has been clarified that when the latent image contrast becomes smaller, the toner discharged onto the photosensitive drum 1 substantially vertically flies toward the exposure surface 21. Therefore, when the latent image contrast is small under actual use conditions, that is, when half tone exposure is performed, exposure flying remarkably occurs. When exposure flying occurs, the exposure surface 21 is screened from light by the adhering toner. Therefore, a site with the toner adhering thereto on the exposure surface 21 cannot apply an appropriate exposure amount to the photosensitive drum, and image defects such as a deficient image occur.

To prevent the aforementioned exposure flying, according to the present embodiment, in a constitution as shown in FIG. 12, the conductive member 22 is disposed along and parallel to the exposure surface 21 on the downstream side of the rotation direction of the photosensitive drum adjacent to the exposure surface 21 of the exposure apparatus 2, and a bias is applied to the conductive member 22. By the present constitution, an electric field directed toward the exposure surface 21 from the photosensitive drum is weakened, an electric field acts in a direction in which the toner discharged onto the photosensitive drum 1 is pressed toward the photosensitive drum 1, and the exposure flying can be prevented from occurring. According to the experiment, when the bias to be applied to the conductive member 22 disposed parallel to and adjacent to the exposure surface 21 of the exposure apparatus 2 is set to have the same polarity as Vd applied by the magnetic brush charging device 3 and the absolute value is set to be equal to or more than that of Vd, the exposure flying can completely be prevented.

Additionally, in the present embodiment, since the bias applied to the magnetic brush charging device 3 can be utilized as the bias to be applied to the conductive member 22 disposed parallel to and adjacent to the exposure surface 21, there is an advantage that the exposure flying can be prevented without adding a new power source apparatus to the conventional apparatus. Here, for the bias to be applied to the conductive member 22 disposed parallel to and adjacent to the exposure surface 21 of the exposing apparatus 2, the bias applied to the magnetic brush charging device 3 and constituted by superposing the alternating-current voltage to the direct-current voltage may be used. Moreover, by applying only the direct-current component, an effect against exposure flying can similarly be fulfilled.

Moreover, in the present embodiment a conductive member 23 is also disposed along the exposure surface 21 on the upstream side of the exposure surface 21 of the exposure apparatus 2, and this conductive member 23 is grounded. By grounding the conductive member 23 on the upstream side of the exposure surface 21 of the exposure apparatus 2, when the bias is applied to the conductive member 22 on the downstream side, the electric field of the direction in which the toner discharged onto the photosensitive drum 1 is pressed toward the photosensitive drum 1 is further strengthened, and the exposure flying can be prevented from occurring. Furthermore, the conductive member 23 can be provided with an effect of dissipating heat generated in the exposure apparatus 2.

Figure 9A:
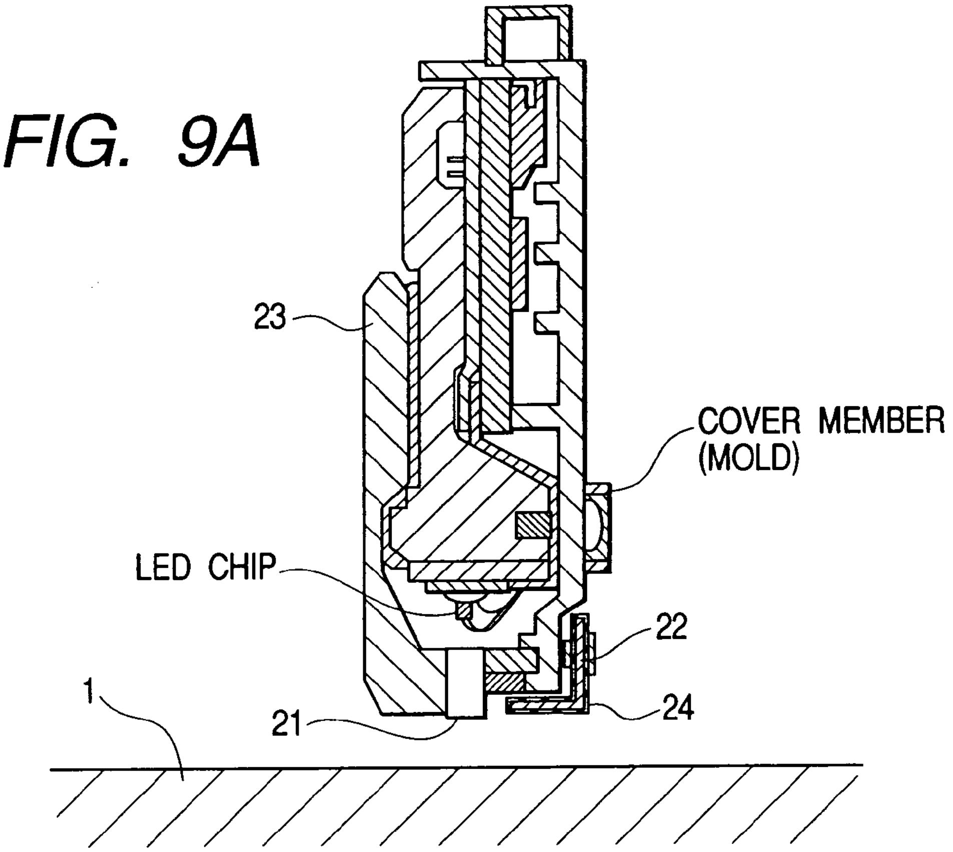
FIG. 9A is a sectional view of exposing means for use in the embodiment of the present invention.
Figure 9B:
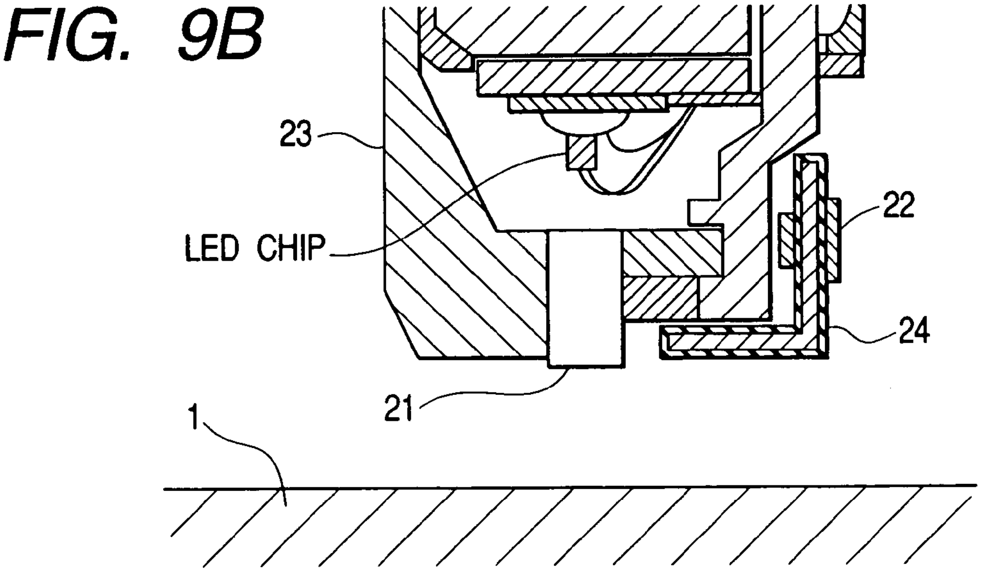
FIG. 9B is an enlarged view of FIG. 9A.

However, in this state, since the conductive member 22 with the bias applied thereto is disposed in the very vicinity of the photosensitive drum 1, spark discharge possibly occurs. Therefore, in the present embodiment, by applying an insulation paint (e.g., epoxy resin or the like) 24 to the surface of the conductive member with the bias applied thereto, spark discharge is prevented from occurring between the conductive member 22 and the photosensitive drum (FIGS. 9A, 9B). Even in such painting process the electric field directed toward the exposure surface 21 from the photosensitive drum surface is weakened, the electric field acts in the direction in which the toner discharged onto the photosensitive drum 1 is pressed toward the photosensitive drum 1, and the effect of preventing the exposure flying from occurring is similarly obtained.

The present embodiment solves the problem that the transfer residual toner discharged from the magnetic brush charging device flies from the photosensitive body surface by the fluctuation of the photosensitive body surface potential distribution by image exposure, adheres to the exposure apparatus and causes the image defect. Additionally, the stable image can be provided over a long period and the spark discharge can be prevented from occurring in the conductive member and photosensitive drum.

The present invention is not limited to the aforementioned embodiment, and includes modifications of the same technical scope.

What is claimed is:

1. An image exposure apparatus comprising:

a light emitting chip including a plurality of light emitting elements;

a base plate for mounting said chip thereon;

an electrode for forming an electric field to prevent toner on an exposure surface from flying out; and an insulative protecting member, provided between said chip and said electrode, for protecting said chip externally and for supporting said electrode, wherein said electrode is supported at both end portions thereof in its longitudinal direction by said protecting member, and an air gap is provided between said electrode and said protecting member.

2. An image exposure apparatus according to claim 1, wherein a span of attachment positions of both ends of said electrode is longer than a length of a mounting area of said chip on said base plate.

3. An image exposure apparatus according to claim 1, wherein one end of said electrode is connected to a power source.

4. An image exposure apparatus according to claim 1, further comprising a frame for supporting said base plate.

5. An image exposure apparatus according to claim 4, wherein said plate is electrically conductive.

6. An image exposure apparatus according to claim 1, wherein a surface of said electrode at a side of the exposure surface is covered with an insulation layer.

* * * * *